(12) United States Patent
Burke et al.

(10) Patent No.: US 6,888,266 B2
(45) Date of Patent: May 3, 2005

(54) VEHICLE WITH SWITCHED SUPPLEMENTAL ENERGY STORAGE SYSTEM FOR ENGINE CRANKING

(75) Inventors: James O. Burke, Richmond, IL (US); Dean R. Solberg, Mundelein, IL (US)

(73) Assignee: Kold Ban International, Ltd., Lake in the Hills, IL (US)

(*) Notice: Subject to any disclaimer, the term of this patent is extended or adjusted under 35 U.S.C. 154(b) by 402 days.

(21) Appl. No.: 10/085,427

(22) Filed: Feb. 28, 2002

(65) Prior Publication Data

US 2002/0130555 A1 Sep. 19, 2002

Related U.S. Application Data

(63) Continuation-in-part of application No. 09/802,284, filed on Mar. 8, 2001
(60) Provisional application No. 60/292,791, filed on May 22, 2001.

(51) Int. Cl.[7] ................................................. H02G 3/00
(52) U.S. Cl. ....................... 307/10.6; 307/9.1; 307/10.1; 307/10.7; 290/38 R
(58) Field of Search ................................ 307/9.1, 10.1, 307/10.6, 10.7; 290/7, 27, 38 R; 180/65.1, 65.3, 65.4

(56) References Cited

U.S. PATENT DOCUMENTS

| 2,659,042 A | 11/1953 | Anderson et al. |
| 3,638,108 A | 1/1972 | Channing |
| 3,942,027 A | 3/1976 | Fima |

(Continued)

OTHER PUBLICATIONS

KBI Kapower Installation Operation Manual (KBI/Kold Ban International, Ltd. 1999).
KBI Kapower Supercapacitors (4–page Brochure KBI/Kold Ban International, Ltd. 1999).
Charge All Wheel Type Battery Chargers (Model 13–012 Boost All, Good All Mfg. 1999).
The Intra Switch, Intra USA 1998.
Battery Optimizer, Purkay's Fleet Electric Inc. 1999.
Low Voltage Disconnects Switches and Alarms, Sure Power Industries Inc. 1998.
U.S. patent application Ser. No. 09/802,284, filed May 1,2001, entitled "Vehicle with Switched Supplemental Energy System for Engine Cranking.".

(Continued)

Primary Examiner—Robert DeBeradinis
(74) Attorney, Agent, or Firm—Brinks Hofer Gilson & Lione

(57) ABSTRACT

A vehicle having an internal combustion engine, a cranking motor, and a battery includes a double-layer capacitor characterized by a capacitance greater than 150 farads, and a low internal resistance. First and second electrical paths interconnect the capacitor with the cranking motor. A control circuit is coupled between the positive and negative terminals of at least one of the capacitor and battery, and this control circuit includes a switch that applies a variable control voltage to a relay in response to the position of the switch. The relay is included in one of the electrical paths, and the relay isolates the capacitor from the cranking motor when switched to the open-circuit condition by the control voltage and enables the capacitor to supply cranking current to the cranking motor when the control voltage places the relay in the closed-circuit condition.

46 Claims, 5 Drawing Sheets

U.S. PATENT DOCUMENTS

| | | |
|---|---|---|
| 4,161,682 A | 7/1979 | Corvette |
| 4,488,147 A | 12/1984 | Signorile |
| 4,492,912 A | 1/1985 | Nowakowski |
| 4,494,162 A | 1/1985 | Eyler |
| 4,510,431 A | 4/1985 | Winkler |
| 4,540,929 A | 9/1985 | Binkley |
| 4,727,306 A | 2/1988 | Misak et al. |
| 4,857,820 A | 8/1989 | Tompkins et al. |
| 4,902,955 A | 2/1990 | Manis et al. |
| 5,039,930 A | 8/1991 | Collier et al. |
| 5,077,513 A | 12/1991 | Dea et al. |
| 5,146,095 A | 9/1992 | Tsuchiya et al. |
| 5,155,373 A | 10/1992 | Tsuchiya et al. |
| 5,157,267 A | 10/1992 | Shirata et al. |
| H1172 H | 4/1993 | Gorniak |
| 5,207,194 A | 5/1993 | Clerici |
| 5,260,637 A | 11/1993 | Pizzi |
| 5,321,389 A | 6/1994 | Meister |
| 5,371,455 A | 12/1994 | Chen |
| 5,563,454 A | 10/1996 | Araki et al. |
| 5,589,292 A | 12/1996 | Rozon |
| 5,637,978 A | 6/1997 | Kellett et al. |
| 5,642,696 A | 7/1997 | Matsui |
| 5,783,872 A | 7/1998 | Blair |
| 5,793,185 A | 8/1998 | Prelec et al. |
| 5,818,115 A | 10/1998 | Nagao |
| 5,925,938 A | 7/1999 | Tamor |
| 5,963,417 A | 10/1999 | Anderson et al. |
| 5,998,961 A | 12/1999 | Brown |
| 6,018,199 A | 1/2000 | Shiroyama et al. |
| 6,034,492 A | 3/2000 | Saito et al. |
| 6,057,667 A | 5/2000 | Mills |
| 6,075,331 A | 6/2000 | Ando et al. |
| 6,130,519 A | 10/2000 | Whiting et al. |
| 6,133,645 A | 10/2000 | Scribner et al. |
| 6,160,373 A | 12/2000 | Dunn et al. |
| 6,163,088 A | 12/2000 | Codina et al. |
| 6,211,577 B1 | 4/2001 | Alksnat et al. |
| 6,212,054 B1 | 4/2001 | Chan |
| 6,222,342 B1 | 4/2001 | Eggert et al. |
| 6,242,887 B1 | 6/2001 | Burke |
| 6,265,851 B1 | 7/2001 | Brien et al. |
| 6,325,035 B1 | 12/2001 | Codina et al. |
| 6,362,595 B1 | 3/2002 | Burke |
| 6,426,606 B1 | 7/2002 | Purkey |
| 2001/0025618 A1 | 10/2001 | Kelling |

OTHER PUBLICATIONS

U.S. Provisional Application No. 60/292,791, filed May 22, 2001, entitled "Vehicle with Switched Energy Storage System for Engine Cranking.".

U.S. patent application No. 09/652,686, filed Aug. 31, 2000, entitled "Vehicle with Supplemental Energy Storage System for Engine Cranking.".

Translation of Japanese Patent Application Publication No. JP 2–175351, published Jul. 6, 1990.

Miller et al., SAE Techincal Paper Series 982794 entitled "Truck Starting Using Electrochemical Capacitors," copyrighted 1998, pp. 1–7.

Miller, John R., "Engineering Battery Capacitor Combinations in High Power applications: Diesel Engine Starting," presented at "The $9^{th}$ International Seminar on Double Layer Capacitors and Similar Energy Storage Devices", Deerfield Beach, Florida, pp. 1–11, Dec. 6–8, 1999.

KBi KAPower "Installation–Operation Manual," KBi/ Kold– Ban International, Ltd., KBi Form #131137 Rev. 06/00, pp. 1–11, 2000.

KBi, "KBi Kranking Kap Super Capacitors", *KBi* Publication, 2000, 2 pages.

"KAPower Super Capacitors", Kold–Ban International, Ltd., brochures, pp. 1–4, 2000.

U.S. patent application Ser. No. 09/838,005, filed Apr. 18, 2001, Inventor: Burke.

KBi, "KrankingKart Professional Jump–Start Unit", obtained at the internet address: http://www.koldban.com/mainpages/karts.htm, Aug. 30, 2001, 3 pages.

Capacitor Log, dated May 15, 2000.

VEHICLE WITH SWITCHED SUPPLEMENTAL ENERGY STORAGE SYSTEM FOR ENGINE CRANKING

This application is a continuation-in-part of U.S. application Ser. No. 09/802,284, filed Mar. 8, 2001, and also claims the benefit of U.S. Provisional Application Ser. No. 60/292,791, filed May 22, 2001, the entire disclosures of which are hereby incorporated herein by reference.

BACKGROUND

The present invention relates to vehicles of the type that include an internal combustion engine, a cranking motor, and a battery normally used to power the cranking motor. In particular, this invention relates to improvements to such systems that increase of the reliability of engine starting.

A problem presently exists with vehicles such as heavy-duty trucks. Drivers may on occasion run auxiliary loads excessively when the truck engine is not running. It is not unusual for heavy-duty trucks to include televisions and other appliances, and these appliances are often used when the truck is parked with the engine off. Excessive use of such appliances can drain the vehicle batteries to the extent that it is no longer possible to start the truck engine.

The present invention solves this prior art problem in a cost-effective manner.

SUMMARY

The preferred embodiment described below supplements a conventional vehicle electrical system with a capacitor. The capacitor is protected from discharging excessively when auxiliary loads are powered, and it is used to supply a cranking current in parallel with the cranking current supplied by the vehicle battery to ensure reliable engine starting. When the vehicle engine is not running, the capacitor is isolated from the vehicle electrical system by an open-circuited relay, and this relay is controlled by a control circuit that itself draws power from the battery and/or the capacitor. In this way, power is always available when the capacitor is charged to close the relay when power is needed for engine cranking. In various preferred embodiments, the control circuit can include one or more switches, including for example and without limitation an ignition switch, an oil pressure switch, a solenoid switch and/or a momentary switch. Methods for cranking an internal combustion engine are also provided.

This section has been provided by way of general introduction, and it is not intended to narrow the scope of the following claims.

DETAILED DESCRIPTION OF THE PREFERRED EMBODIMENTS

Figure 1:
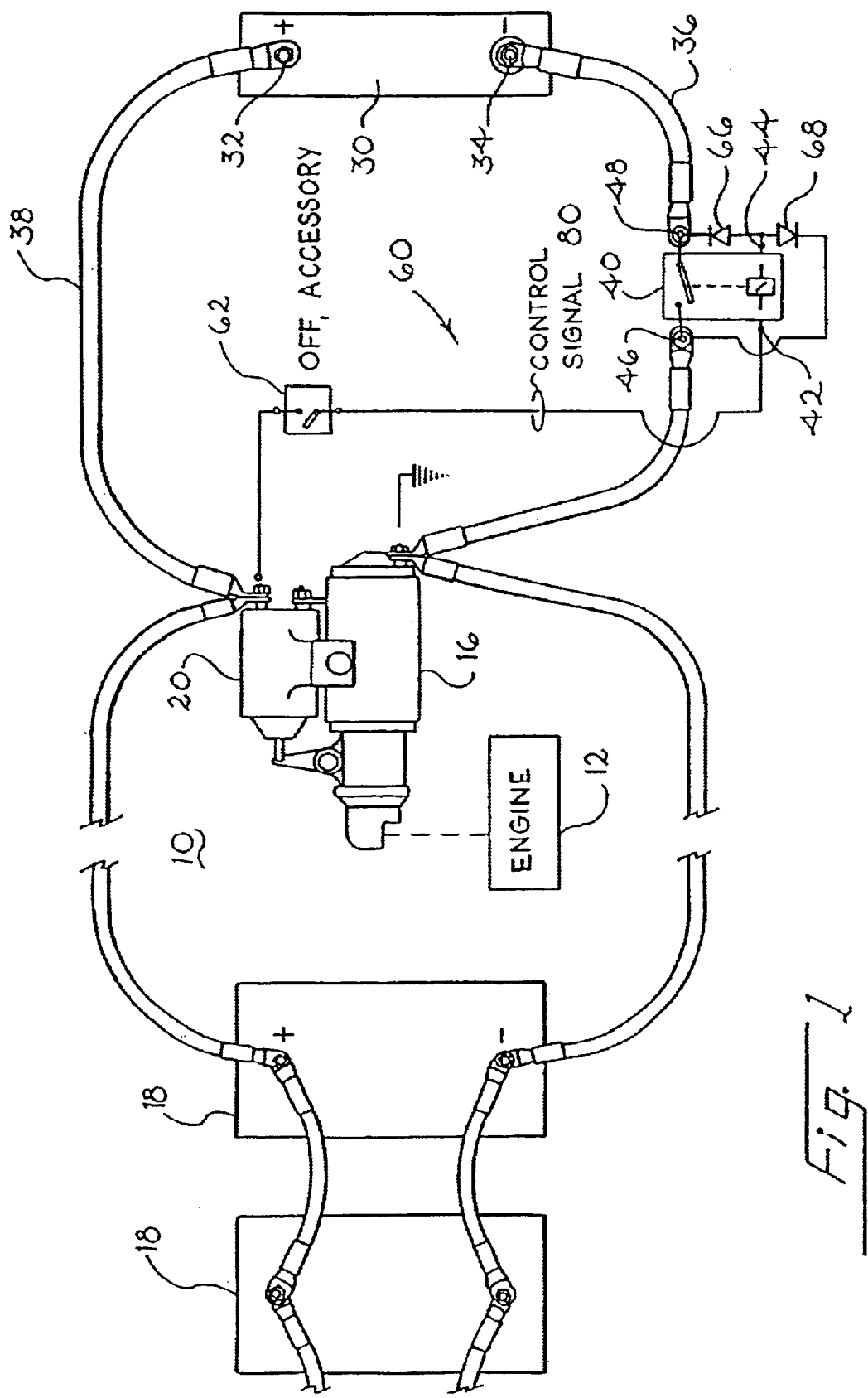
FIG. 1 is a block diagram of a vehicle electrical system that incorporates a preferred embodiment of this invention, showing a relay in an open-circuit condition.

Turning now to the drawings, FIGS. 1–5 show an electrical system of a vehicle 10 that includes an internal combustion engine 12. The engine 12 can take any suitable form, and may for example be a conventional diesel or gasoline engine. The engine 12 is mechanically coupled to a cranking motor 16. The cranking motor 16 can take any suitable form, and it is conventionally an electrical motor that is powered during cranking conditions by current from one or more storage batteries 18 such as conventional lead-acid batteries. Current from the batteries 18 is switched to the cranking motor 16 via a switch such as a conventional solenoid switch 20.

All of the elements 10 through 20 described above may be entirely conventional, and are well-known to those skilled in the art. The present invention is well adapted for use with the widest variety of alternative embodiments of these elements.

In addition to the conventional electrical system described above, the vehicle 10 also includes a supplemental electrical system including a capacitor 30. The capacitor 30 is preferably a double layer capacitor of the type known in the art as an electrochemical capacitor. Suitable capacitors may be obtained from KBI, Lake in the Hills, Ill. under the trade name KAPower. For example, in one alternative embodiment, the capacitor 30 has a capacitance of 1000 farads, a stored energy capacity of 60 kilojoules, an internal resistance at −30 degrees Celsius of 0.003 ohms, and a maximum storage capacity of 17 kilowatts. In general, the capacitor should have a capacitance greater than 150 farads, and an internal resistance at 20° C. that is preferably less than 0.008 ohms, more preferably less than 0.006 ohms, and most preferably less than 0.003 ohms. The energy storage capacity is preferably greater than 15 kJ. Such capacitors provide the advantage that they deliver high currents at low temperatures and relatively low voltages because of their unusually low internal resistance. Further information about suitable capacitors for use in the system of FIGS. 1–5 can be found in publications of ESMA, Troitsk, Moscow region, Russia and on the Internet at www.esma-cap.com.

The capacitor 30 includes a positive terminal 32 and a negative terminal 34. The positive terminal 32 is connected with the cranking motor via an electrical path 38 that includes a suitable cable and the solenoid switch 20. The negative terminal 34 is connected to the cranking motor 16 by another electrical path 36 that includes suitable cables and a relay 40. The relay 40 includes first and second control terminals 42, 44 and first and second switched terminals 46, 48. The switched terminals 46, 48 are included in the electrical path 36 such that the relay 40 interrupts the electrical path 36 when the relay is in an open-circuit condition and the relay 40 completes the electrical path 36 when the relay is in a closed-circuit condition.

The relay 40 may take many forms, and may include an electromechanical switch or a solid-state switch. By way of example, a 500 amp, 12 volt electromechanical relay can be used such as that supplied by Kissling as part number 29.511.11. As an example of a suitable solid-state relay, the MOSFET switch sold by Intra USA under the trade-name Intra Switch can also be used.

The relay 40 is controlled by a control circuit 60 that is coupled between the positive and negative terminals 32, 34 of the capacitor, and/or between the positive and negative terminals of the battery, for example between the solenoid switch 20 and a system ground.

Figure 2:
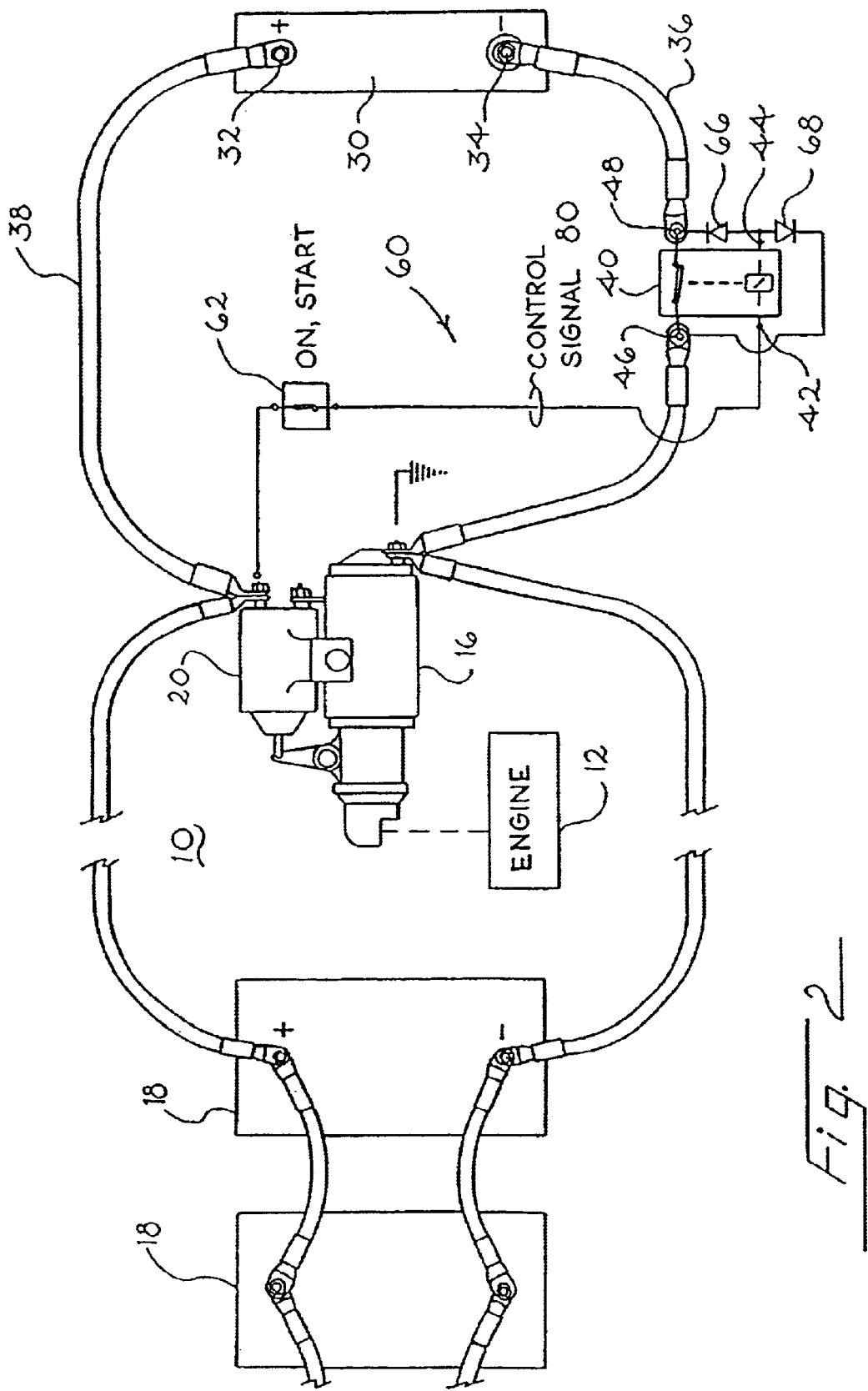
FIG. 2 is a schematic diagram of the system of FIG. 1, showing the relay in a closed-circuit condition.

In a first embodiment, shown in FIGS. 1 and 2, the control circuit 60 includes a switch 62 that is preferably the ignition switch of the vehicle. A conventional ignition switch includes four positions: accessory, off, on, start. Of course, in other embodiments, other switches having other positions can be used.

In this example, the switch 62 is connected between the positive terminal 32 of the capacitor and a positive terminal of the battery and the first control terminal 42 of the relay. The second control terminal 44 of the relay is connected via a first diode 66 to the negative terminal 34 of the capacitor 30 and via a second diode 68 to system ground. As shown in FIG. 1, the diodes 66, 68 are connected between the second control terminal 44 and the electrical path 36 on respective sides of the relay 40.

The switch 62 applies a control signal 80 or positive control voltage to the relay 40. In this example, when the switch 62 is closed, the control signal 80 is held at a positive voltage (assuming the capacitor 30 and/or battery 18 are charged), and this positive voltage places the relay 40 in a closed-circuit condition, which places the negative terminal 34 in low-resistance contact with the cranking motor 16. Alternatively, when the switch 62 is opened, the control signal 80 is at a low voltage, and the relay 40 is in an open-circuit condition. In this condition the relay 40 interrupts the electrical path 36, thereby isolating the negative terminal 34 of the capacitor 30 from the cranking motor 16, or other system ground.

The operation of the system described above will be explained first in conjunction with FIGS. 1 and 2. Though not shown in FIG. 1, the electrical system of the vehicle includes a conventional generator or alternator driven by the engine when running to charge both the batteries 18 and capacitor 30. Thus, the capacitor 30 is generally fully charged when the switch 62 is moved to the off or accessory position, and because the relay 40 is in the open-circuit condition, this state of charge of the capacitor 30 is preserved.

FIG. 1 shows the state of the system when the switch 62 is opened, as for example when the ignition switch of the vehicle is in the off position or the accessory position. When the switch is opened, the relay 40 is in the open-circuit condition, and the capacitor 30 is prevented from discharging. The driver of the vehicle is free to use accessory power as desired, but such usage will at most drain the batteries 18, while leaving the capacitor 30 in a full state of charge.

FIG. 2 shows the state of the system when the switch 62 is moved is moved to the on position or the start position, thereby closing the switch 62 and placing the relay 40 in the closed-circuit condition. In this state, the relay 40 interconnects the negative terminal 34 and system ground, thereby reconnecting the capacitor 30 with the electrical system of the vehicle and making the power stored in the capacitor 30 available for use in engine cranking. Thereafter, the switch 62 is preferably place in the run position, and thereby maintains the relay 40 in the closed-circuit condition and connects the capacitor 30 to the electrical system including the batteries 18 throughout the time that the engine 12 is running, or until the switch is moved to the off or accessory position. This allows the engine alternator (not shown) to recharge the capacitor 30.

Figure 3:
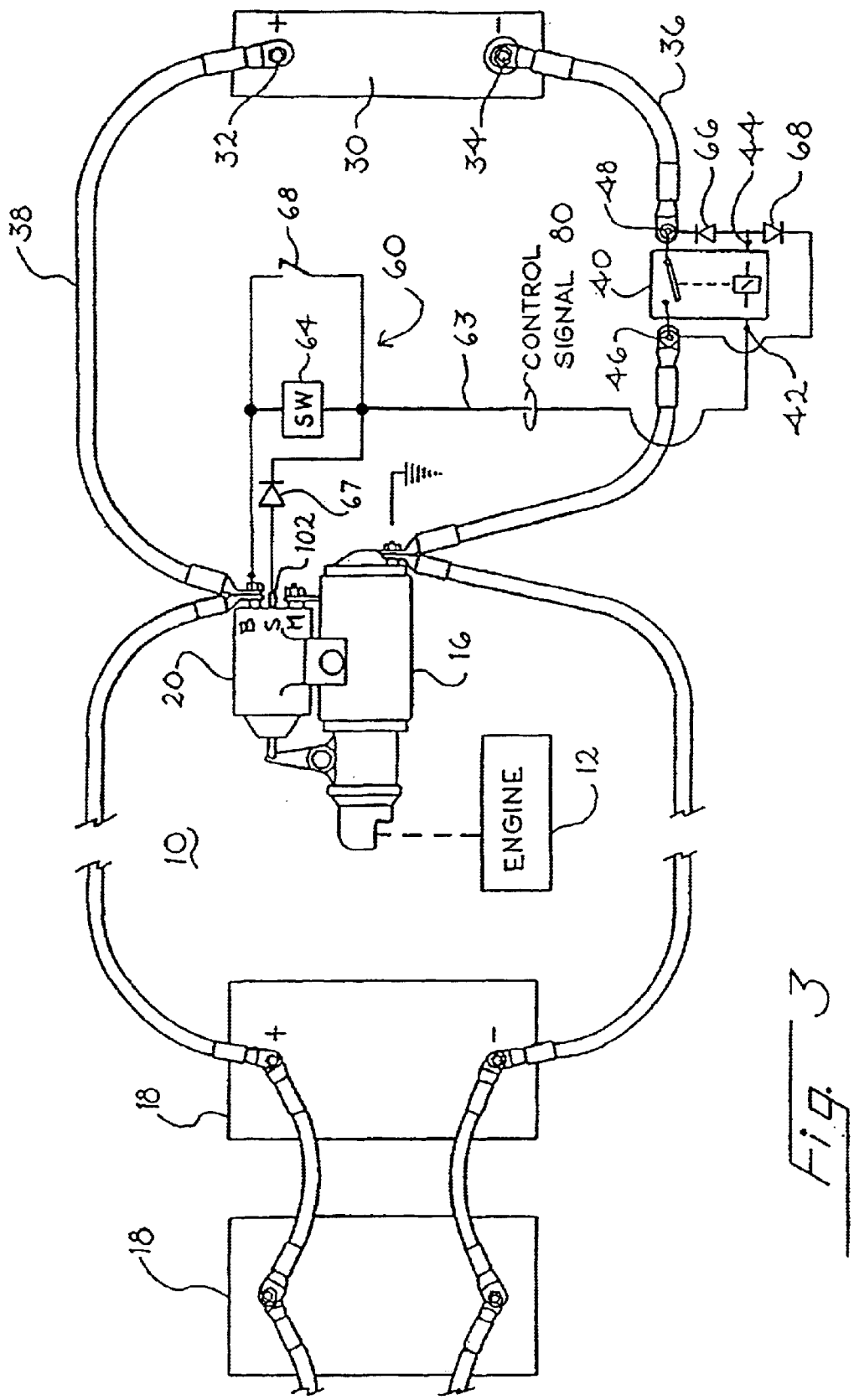
FIG. 3 is a schematic diagram of an alternative preferred embodiment of a vehicle electrical system.

Referring to the preferred embodiment of FIG. 3, the control circuit 60 includes a normally open oil pressure switch 64, a diode 67, and a manually controlled momentary push button switch 68. The normally open oil pressure switch 64 is connected on one side to the electrical path 38 and on the other side to a conductor 63, which provides an electrical path between the oil pressure switch and the control terminal 42 of the relay 40. When engine oil pressure of the engine 12 rises above a set value, or a minimum predetermined value, the normally open oil pressure switch 64 closes, thereby applying a positive voltage from the electrical path 38 to the control terminal 42. In various exemplary preferred embodiments, the minimum predetermined oil pressure is between about 10 and 30 psi, although it should be understood that it could be a greater or lesser value. When a positive voltage is applied via the conductor 63 to the control terminal 42, this positive voltage places the relay 40 in a closed-circuit condition, which completes the circuit and places the negative terminal 34 in low-resistance contact with the cranking motor 16.

Alternatively, when the voltage on the conductor 63 is in a low voltage state, the relay 40 is in an open-circuit condition. In this condition, the relay 40 interrupts the electrical path 36, thereby isolating the negative terminal 34 of the capacitor 30 from the cranking motor 16. Thus, the oil pressure switch 64 closes the relay 40 and connects the capacitor 30 to the electrical system including the batteries 18 throughout the time that the engine 12 is running. This allows the engine alternator (not shown) to recharge the capacitor 30.

In one preferred embodiment, a diode 67 is included in a circuit that connects the conductor 63 with the S terminal 102 of the solenoid switch 20. This S terminal 102 provides a positive voltage whenever the solenoid switch 20 commands operation of the cranking motor 16. Thus, whenever the cranking motor 16 is commanded to start the engine, the positive voltage applied by the battery 18 and capacitor 30 at the S terminal of the solenoid switch 20 passes via the diode 67 and the conductor 63 to the control terminal 42, where it closes the relay 40. In this way, the power stored in the capacitor 30 is made available for engine cranking. Of course, it should be understood that the one or more batteries 18, if charged, can provide the positive voltage in conjunction with the capacitor at the S terminal 102 to close the relay 40, and also provide power for engine cranking.

The momentary push button switch 68 is not normally used. However, in the event the batteries 18 and the capacitor 30 are both discharged, the manual momentary push button switch 68 may be used to close the relay 40 to allow the capacitor 30 to be charged by an external battery charging device (not shown). The diode 67 prevents the cranking motor from being reengaged when the momentary switch 68 is closed.

Figure 4:
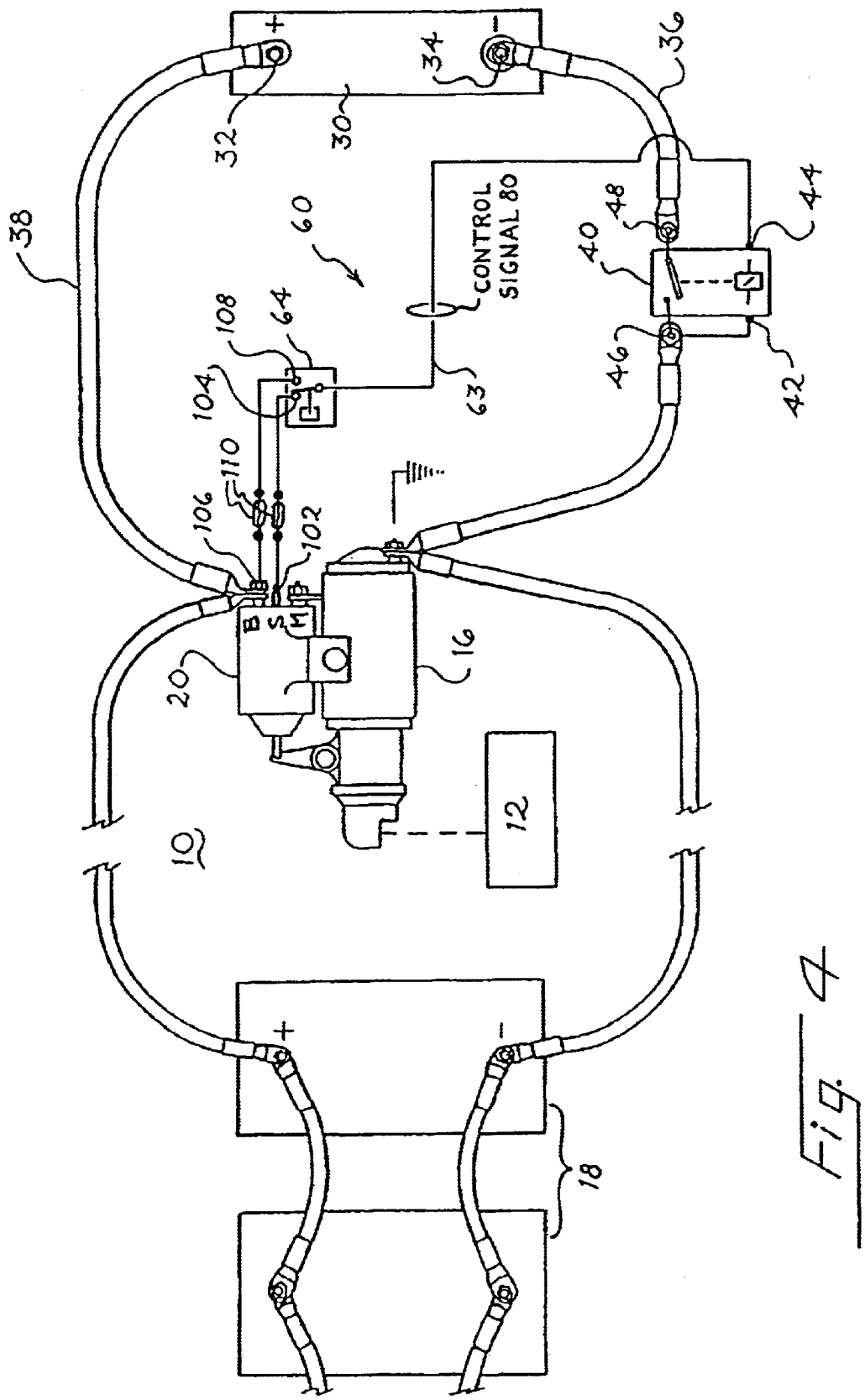
FIG. 4 is a schematic diagram of an alternative preferred embodiment of a vehicle electrical system.

In an alternative embodiment, shown in FIG. 4, the control circuit is similar to that of the embodiment shown in FIG. 3, except that S terminal 102 is electrically connected to a normally closed circuit terminal 104 on the oil pressure switch 64, and the B terminal 106 is connected to a normally open circuit terminal 108 on the oil pressure switch 64. In one exemplary preferred embodiment, the oil pressure switch 64 is a single pole, double throw (SPDT) oil pressure switch. One suitable SPDT oil pressure switch is available from Nason Co., located in South Union, N.C. under Part No. SM-2C-30R/WL. In addition, a pair of fuses 110, for example 10 amp fuses, are positioned in the paths between the battery B and solenoid S terminals 106, 102 of the solenoid switch 20 and the terminals 108,106 of the oil pressure switch 64. The conductor 63 runs between and couples the oil pressure switch 64 and the control terminal 44 of the relay 40. In this embodiment, the diodes 66, 67 and 68 are preferably not included, and the control terminal 42 is directly coupled to the switch terminal 46, or to the cranking motor or other ground. By reversing the connection of the oil pressure switch 64 from control terminal 42 to control terminal 44 of the relay, and by eliminating the diodes, the capacitor 30 is isolated from the control circuit 60 controlling the relay 40. This system may be desired in those instances where the diodes tend to leak over long periods of time, thereby dissipating the charge in the capacitor. However, one disadvantage is that the capacitor is not available to close the relay in the event that the battery has insufficient charge to make such closure.

In operation of either embodiment of FIGS. 3 and 4, during cranking, the S terminal 106 provides a positive voltage, whether from the battery alone or from the capacitor and battery, that passes via the normally closed circuit of the oil pressure switch 64 and the conductor 63 to one of the control terminals 42, 44, where it closes the relay 40. Once the engine 12 is running and generating at least a minimum predetermined oil pressure, the normally open circuit of the oil pressure switch 64 is closed so as to maintain the relay 40 in the closed-circuit condition.

Referring to FIGS. 3 and 4, it should be apparent that the control circuit 60 operates automatically to connect the capacitor 30 with the electrical system of the vehicle while the engine 12 is running and the oil pressure is above the preset level, as well as during periods of engine cranking. This is accomplished without any driver intervention. Also, when the engine is not running and oil pressure is low, and when the engine is not being cranked, the control circuit 60 automatically causes the relay 40 to open, thereby disconnecting the capacitor 30 from the electrical system of the vehicle. For this reason, the vehicle operator cannot inadvertently drain the capacitor 30 with auxiliary loads, for example when leaving the ignition switch in the run position. The driver of the vehicle is free to use accessory power as desired, regardless of whether the ignition switch is in the run position or the accessory position, and such usage will at most drain the batteries 18, leaving the capacitor 30 in a full state of charge. Of course, as explained above, the capacitor 30 in the preferred embodiment of FIG. 4 is not available to subsequently close the relay 40.

Figure 5:
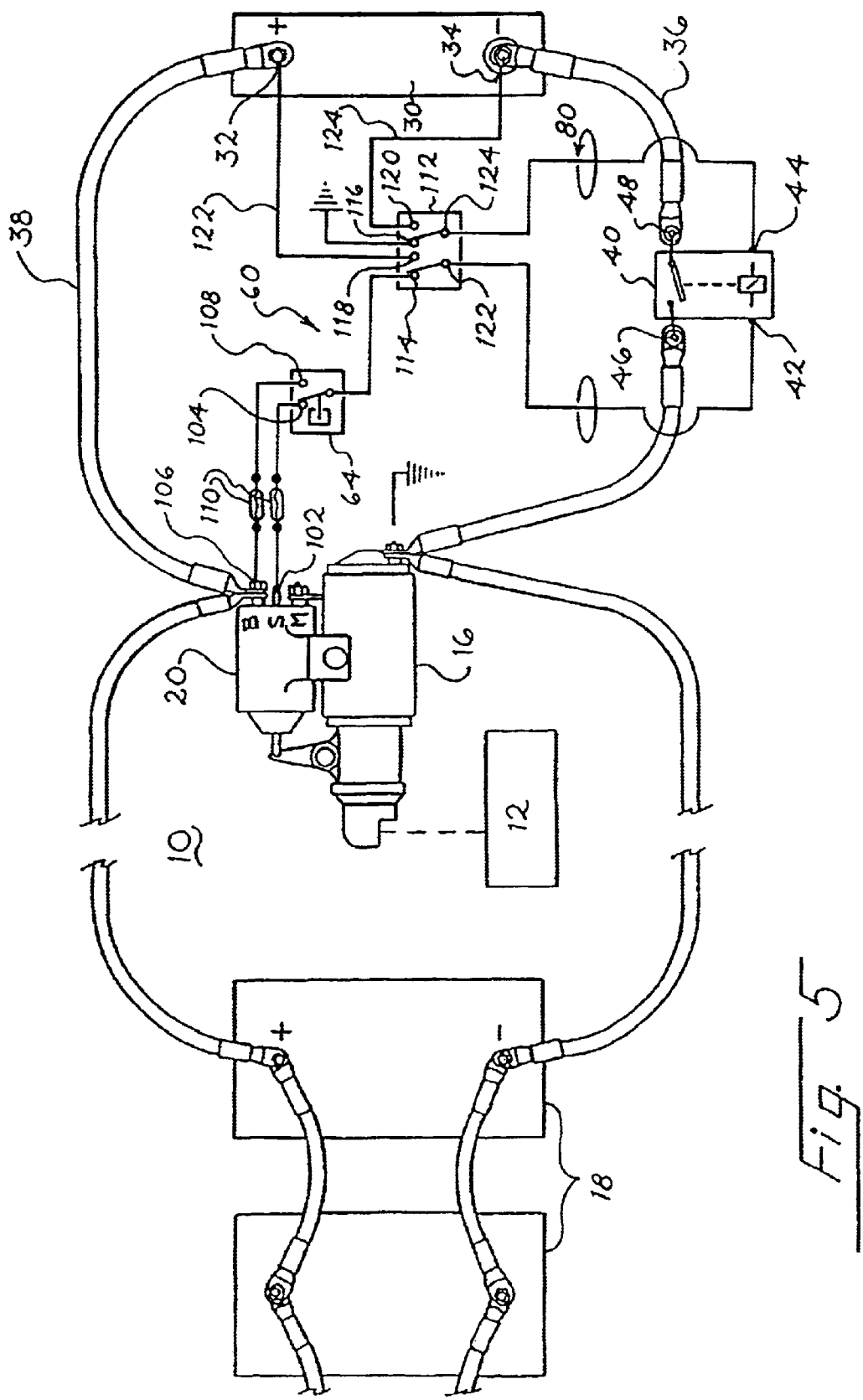
FIG. 5 is a schematic diagram of an alternative preferred embodiment of a vehicle electrical system.

To remedy that problem, and with reference to FIG. 5, yet another alternative embodiment of a control circuit is shown as a modified version of the system of FIG. 4. In this embodiment, a momentary switch 112 is coupled between the normally open oil pressure switch 64 and the control terminals 42, 44 of the relay 40. The momentary switch 112 is a normally closed switch that completes the path between the oil pressure switch 64 and the relay 40. In a preferred embodiment, the momentary switch is preferably a double pole double throw (DPDT) on/momentary toggle switch. One suitable DPDT switch is the toggle switch Part No. 7208SYZQE available from C&K, USA. Of course many conventional and known types of DPDT switches would also be suitable.

In a preferred embodiment, the normally open oil pressure switch is electrically connected to one of the "on" terminals 114 of the momentary switch 112, with the other "on" terminal 116 being connected to the system ground. First and second momentary terminals 118, 120 are connected to the positive and negative terminals 32,34 of the capacitor 30 respectively. First and second common terminals 122, 124 of the momentary switch 112 are connected to the first and second control terminals 42, 44 respectively so as to apply a voltage thereacross.

In operation, the momentary switch 112 is in the normally closed or "on" position, wherein the system operates substantially as described above with respect to the embodiment of FIG. 4, but with the control signal 80 or positive voltage being transmitted through and across the momentary switch 112 to the control terminal 44 of the relay 40. However, in the event that the voltage applied by the battery 18 through the oil pressure switch 64 and the normally closed momentary switch 112, positioned in the "on" position, and across the terminals 44, 42 of the relay 40 is not great enough to place the relay in the closed-circuit condition, the momentary switch 112 can be moved by the user to the momentary position, for example by holding down a toggle switch. In the momentary position, the "on" circuit between the oil pressure switch 64 and the relay 40 is opened, and the momentary circuit between the terminals 32, 34 of the capacitor 30 via electrical paths 122, 124 is closed. In this way, the momentary switch 112 brings the capacitor 30 into the circuit, bypassing the solenoid switch 20 and battery 18, so as to apply a positive voltage across the terminals 44, 42 of the relay 40 and thereby move the relay 40 to the closed-circuit condition. Thereafter, the power stored in the capacitor 30 is made available for engine cranking. Once the engine 12 is started, with the relay 40 in the closed-circuit condition, the operator can release the momentary switch 112, which then moves to the normally closed "on" position. Thereafter, the minimum predetermined oil pressure being generated by the engine 12 maintains the oil pressure switch 64 in the closed position and keeps the relay 40 in the closed-circuit condition, in which an engine alternator, or other generator device, can recharge the capacitor 30.

It should be understood that the momentary switch can also be used in series with the switch of FIGS. 1 and 2 when the capacitor is isolated and the diodes are omitted.

If a second starting attempt is required, the momentary switch 68, 112, shown in FIGS. 3 and 5, can be moved to the momentary position for a period of time, for example and without limitation, 30–60 seconds, without cranking the engine. Assuming that the capacitor 30 has sufficient charge to close the relay 40, this will allow the battery 18 to charge the capacitor 30. Once charged, the cranking operation can be attempted again with the aid of the capacitor, for example in FIG. 5, by keeping the momentary switch 112 in the momentary position. This process can be repeated as needed provided that the batteries 18 have sufficient charge, for example and without limitation 10 volts, to charge the capacitor 30.

In particular, though not shown in FIGS. 1–5, the electrical system of the vehicle 10 includes a conventional generator or alternator driven by the engine 12 when running to charge both the batteries 18 and the capacitor 30. Thus, the capacitor 30 is generally fully charged when the engine is shut down. Because the relay 40 is in the open-circuit condition, this state of charge of the capacitor 30 is preserved.

The systems described above provide a number of important advantages. The supplemental electrical system including the capacitor 30 provides adequate current for reliable engine starting, even if the batteries 18 are substantially discharged by auxiliary loads when the engine 12 is not running. If desired, the supplemental electrical system including the capacitor 30 may be made invisible to the user of the vehicle. That is, the vehicle operates in the normal way, but, in certain embodiments and under certain conditions, the starting advantages provided by the capacitor 30 are obtained without any intervention on the part of the user. In other embodiments, the user can use the momentary switch 112 to close the relay so as to make the capacitor available to supplement the cranking operation. The capacitor is automatically disconnected from the vehicle electrical system when the vehicle is turned off, and automatically reconnected to the vehicle electrical system when the engine is started.

Additionally, the capacitor 30 provides the advantage that it can be implemented with an extremely long-life device that can be charged and discharged many times without reducing its efficiency in supplying adequate cranking current.

This system does not interfere with conventional availability of the batteries 18 to power accessories when the engine is off. This reduces the incentive of the vehicle operator to defeat the system.

Referring to the embodiments of FIGS. 1–3 and 5, the control system 60 is powered with the stored voltage on the capacitor 30 and/or batteries 18. Thus, as long as the capacitor 30 includes an adequate charge to start the engine 12, it will provide an adequate voltage to close the relay 40. This is a substantial advantage, because if the control circuit 60 were connected simply between the positive terminal of the capacitor and system ground, a condition might arise in which the batteries 18 stored insufficient charge to close the relay 40, thereby preventing an operator from starting the engine 12 even though adequate charge was available in the capacitor 30.

As used herein, the term "coupled with" is intended broadly to encompass direct and indirect coupling. Thus, first and second elements are said to be coupled with one another whether or not a third, unnamed, element is interposed therebetween. For example, two elements may be coupled with one another by means of a switch.

The term "battery" is intended broadly to encompass a set of batteries including one or more batteries.

The term "set" means one or more.

The term "path" is intended broadly to include one or more elements that cooperate to provide electrical interconnection, at least at some times. Thus, a path may include one or more switches or other circuit elements in series with one or more conductors.

Of course, many alternatives are possible. For example, the relay can be placed in the electrical path that interconnects the positive terminal of the capacitor and the cranking motor or in both electrical paths that interconnect with the capacitor. Various switches and relays can be used to implement the functions described above, and cables and cable terminations can be adapted as appropriate. For example, it is not essential in all embodiments that an engine oil pressure switch be used to indicate when the engine is running. Other parameters indicative of engine operation can be used to control the switch 64, such as alternator output, flywheel rotation, or engine temperature. Similarly, the portion of the control circuit 60, including the diode 66, may be connected to other portions of the electrical system that provide a voltage that varies in amplitude depending upon whether engine cranking is being commanded. For example, the diode 66 can be connected to the start position of the ignition switch (not shown), or to the M-terminal of the solenoid 20. The manual push button switch 68 is optional and is not required in all embodiments, and in some cases the diode 66 can be deleted and replaced with a switched circuit that automatically isolates the conductor 62 from the engine cranking signal when the engine is running.

The foregoing description has discussed only a few of the many forms that this invention can take. For this reason, this detailed description is intended by way of illustration, not limitation. It is only the claims, including all equivalents, that are intended to define the scope of this invention.

What is claimed is:

1. In a vehicle comprising an internal combustion engine, a cranking motor coupled with the engine to crank the engine, and a battery coupled with the cranking motor, the improvement comprising:

a capacitor comprising first and second terminals;

first and second electrical paths interconnecting the first and second terminals, respectively, with the cranking motor and a system ground;

a first switch comprising a circuit positionable between at least an open and closed position, said first switch coupled to the battery;

a second switch comprising a first circuit coupled between said first switch and said system ground and a second circuit coupled between the first and second terminals of the capacitor, wherein said second switch is moveable between an on position and a momentary position; and a relay included in one of the first and second electrical paths and coupled to said second switch, said relay moveable between at least a closed-circuit condition, in which the relay completes said one of the first and second electrical paths, and an open-circuit condition, in which the relay interrupts said one of the first and second electrical paths, wherein the battery applies a first control voltage through said circuit of said first switch when said circuit of said first switch is in the closed position and through said first circuit of said second switch when said second switch is in the on position, and wherein said capacitor applies a second control voltage through said second circuit of said second switch when said second switch is in the momentary position, and wherein said relay is moveable to said closed-circuit condition in response to at least one of said first and second control voltages being applied thereto.

2. The invention of claim 1 wherein said first switch comprises an ignition switch of the vehicle, wherein said circuit of said first switch is moveable to the closed position when said ignition switch is moved to at least one of a run and start position, and wherein said first switch is moveable to the open position when said ignition switch is moved to at least one of an accessory and off position.

3. The invention of claim 1 wherein said first switch comprises an ignition switch of the vehicle, wherein said circuit of said first switch is moveable to the closed position when said ignition switch is moved to a start position, and wherein said first switch is moveable to the open position when said ignition switch is moved to an off position.

4. The invention of claim 1 wherein the relay comprises first and second control terminals, and wherein said second switch is coupled to said first and second control terminals.

5. The invention of claim 1 further comprising third and fourth electrical paths interconnecting said second switch and said first and second relay control terminals.

6. The invention of claim 1 wherein said first switch comprises an oil pressure switch, wherein said circuit of said oil pressure switch is positionable in the closed position in response to at least a predetermined minimum oil pressure being applied to said oil pressure switch.

7. The invention of claim 6 wherein said circuit of said oil pressure switch comprises a normally open circuit, and wherein said oil pressure switch further comprises a normally closed circuit, and further comprising a solenoid switch coupled to the cranking motor and comprising a solenoid terminal coupled to said normally closed circuit of said oil pressure switch, wherein said battery applies said first control voltage to said relay through said solenoid terminal, said normally closed circuit of said oil pressure switch and said first circuit of said second switch during engine cranking.

8. The invention of claim 1 wherein said relay is included in said second electrical path.

9. The invention of claim 1 wherein said capacitor comprises a double layer capacitor characterized by a capacitance greater than about 150 farads and an internal resistance at 20° C. less than about 0.008 ohms.

10. In a vehicle comprising an internal combustion engine, a cranking motor coupled with the engine to crank the engine, and a battery coupled with the cranking motor, the improvement comprising:
 a capacitor comprising first and second terminals;
 first and second electrical paths interconnecting the first and second terminals, respectively, with the cranking motor and a system ground;
 an oil pressure switch comprising a circuit positionable between at least an open and closed position, said oil pressure switch coupled to at least one of the battery and said capacitor; and
 a relay included in one of the first and second electrical paths and coupled to said oil pressure switch, said relay positionable between at least a closed-circuit condition, in which the relay completes said one of the first and second electrical paths and an open-circuit condition, in which the relay interrupts said one of the first and second electrical paths, wherein said at least one of the battery and said capacitor apply a control voltage to said relay when said oil pressure switch circuit is positioned in said closed position, and wherein said relay is positioned in said closed-circuit condition in response to said control voltage being applied thereto when said oil pressure switch circuit is positioned in the closed position.

11. The invention of claim 10 wherein the relay comprises first and second control terminals, and further comprising first and second diodes coupled between the second relay control terminal and the first electrical path on opposite sides of the relay respectively.

12. The invention of claim 11 further comprising an electrical path coupling the oil pressure switch and the first relay control terminal.

13. The invention of claim 10 further comprising at least a predetermined minimum oil pressure applied to said oil pressure switch, and wherein said oil pressure switch circuit is positioned in the closed position in response to said predetermined minimum oil pressure being applied thereto.

14. The invention of claim 10 further comprising a solenoid switch coupled to the cranking motor and comprising a solenoid terminal applying said control voltage during engine cranking, and wherein said oil pressure switch circuit comprises a normally open circuit, and wherein said oil pressure switch further comprises a normally closed circuit coupled to said solenoid terminal, wherein said relay is moveable to said closed-circuit condition in response to said control voltage being applied thereto through said normally closed circuit of said oil pressure switch during engine cranking.

15. The invention of claim 10 wherein said control voltage is a first control voltage, and further comprising a momentary switch coupled between said first and second terminals of the capacitor and moveable to at least a momentary position, wherein said capacitor applies a second control voltage to said relay when said momentary switch is moved to said momentary position, and wherein said relay is moveable to said closed-circuit condition in response to said second control voltage being applied thereto.

16. The invention of claim 15 wherein said momentary switch is connected to said first and second terminals of said capacitor via third and fourth electrical paths, wherein said capacitor applies said second control voltage to said relay when said momentary switch is moved to said momentary position.

17. The invention of claim 15 wherein said momentary switch is further coupled between said relay and said oil pressure switch, and wherein said momentary switch is moveable between at least an on position and said momentary position, wherein said at least one of the battery and said capacitor applies said first control voltage to said relay when said momentary switch is moved to said on position and wherein said capacitor applies said second control voltage when said momentary switch is moved to said momentary closed position.

18. The invention of claim 15 wherein said first and second control voltages are substantially the same.

19. The invention of claim 10 wherein said capacitor is characterized by a capacitance greater than about 150 farads and an internal resistance at 20° C. less than about 0.008 ohms.

20. The invention of claim 10 further comprising a solenoid switch coupled to the cranking motor and comprising a solenoid terminal applying said control voltage during engine cranking, and further comprising an electrical path connecting said solenoid terminal and said relay, and further comprising a diode disposed in said electrical path between said solenoid terminal and said relay.

21. The invention of claim 20 wherein said solenoid switch further comprises a battery terminal and a momentary switch coupled between the battery terminal and the relay, wherein said momentary switch is connected to said electrical path between said solenoid terminal and said relay at a location between said diode and said relay.

22. The invention of claim 10 wherein said relay is included in said second electrical path.

23. A method for cranking an internal combustion engine comprising:
 providing an electrical system comprising a capacitor comprising first and second terminals interconnected with a cranking motor and a system ground by way of first and second electrical paths respectively; a first switch comprising a circuit positionable between at least an open and closed position, said first switch coupled to a battery; a second switch comprising a first circuit coupled between said first switch and said system ground and a second circuit coupled between the first and second terminals of the capacitor, wherein said second switch is positionable between an on position and a momentary position; and a relay included in one of the first and second electrical paths and coupled to said second switch, said relay moveable between at least a closed-circuit condition, in which the relay completes said one of the first and second electrical paths, and an open-circuit condition, in which the relay interrupts said one of the first and second electrical paths;
 positioning said circuit of said first switch in said closed position;
 positioning said second switch in said on position;
 applying a first control voltage to said relay with said battery through said circuit of said first switch when said circuit of said first switch is in the closed position and through said first circuit of said second switch when said second switch is in the on position;
 positioning said second switch in said momentary position;
 applying a second control voltage to said relay with said capacitor through said second circuit of said second switch when said second switch is in the momentary position; and positioning said relay in said closed-circuit condition in response to at least one of said first and second control voltages being applied thereto and thereby completing said one of the first and second electrical paths.

24. The method of claim 23 wherein said first control voltage is insufficient to position said relay in said closed-circuit condition and wherein said positioning said relay in said closed-circuit condition comprises positioning said relay in said closed-circuit condition in response to said second control voltage being applied thereto.

25. The method of claim 24 wherein said first control voltage is approximately zero.

26. The method of claim 23 wherein said first switch comprises an ignition switch of the vehicle, and wherein said positioning said circuit of said first switch in said closed position comprises moving said ignition switch to at least one of a run and start position, and further comprising positioning said circuit of said first switch in said open position by moving said ignition switch to at least one of an accessory and off position.

27. The method of claim 23 wherein said first switch comprises an ignition switch of the vehicle, and wherein said positioning said circuit of said first switch in said closed position comprises moving said ignition switch to a start position, and further comprising positioning said circuit of said first switch in said open position by moving said ignition switch to an off position.

28. The method of claim 23 wherein the relay comprises first and second control terminals, and wherein said second switch is coupled to said first and second control terminals.

29. The method of claim 28 further comprising third and fourth electrical paths interconnecting said second switch and said first and second relay control terminals.

30. The method of claim 23 wherein said first switch comprises an oil pressure switch, wherein said positioning said circuit of said first switch in said closed position comprises applying at least a predetermined minimum oil pressure to said oil pressure switch.

31. The method of claim 30 wherein said circuit of said oil pressure switch comprises a normally open circuit, and wherein said oil pressure switch further comprises a normally closed circuit, and wherein said providing said electrical system further comprises providing a solenoid switch coupled to the cranking motor and comprising a solenoid terminal coupled to said normally closed circuit of said oil pressure switch, and wherein said applying said first control voltage to said relay with said battery through said circuit of said first switch comprises applying said first control voltage to said relay through said solenoid terminal, said normally closed circuit of said oil pressure switch and said normally closed circuit of said second switch during engine cranking.

32. The method of claim 23 wherein said capacitor comprises a double layer capacitor characterized by a capacitance greater than about 150 farads and an internal resistance at 20° C. less than about 0.008 ohms.

33. The method of claim 23 wherein said relay is included in said second electrical path.

34. A method for cranking an internal combustion engine comprising:
providing an electrical system comprising a capacitor comprising first and second terminals interconnected with a cranking motor and a system ground by way of a first and second electrical paths respectively; an oil pressure switch comprising a circuit positionable between at least an open and closed position, said oil pressure switch coupled to at least one of a battery and said capacitor; and a relay included in one of the first and second electrical paths and coupled to said oil pressure switch, said relay moveable between at least a closed-circuit condition, in which the relay completes said one of the first and second electrical paths, and an open-circuit condition, in which the relay interrupts said one of the first and second electrical paths;

applying at least a minimum predetermined oil pressure to said oil pressure switch and thereby positioning said circuit of said oil pressure switch in said closed position;

applying a control voltage to said relay with said at least one of the battery and said capacitor when said oil pressure switch circuit is positioned in said closed position; and positioning said relay in said closed-circuit condition in response to said control voltage being applied thereto and thereby completing said one of said first and second electrical paths.

35. The method of claim 34 wherein the relay comprises first and second control terminals, and wherein said providing said electrical system further comprises providing first and second diodes coupled between the second relay control terminal and said one of the first and second electrical paths on opposite sides of the relay respectively.

36. The method of claim 35 wherein said providing said electrical system further comprises providing an electrical path coupling the oil pressure switch and the first relay control terminal.

37. The method of claim 34 wherein said providing said electrical system further comprises providing a solenoid switch coupled to the cranking motor and comprising a solenoid terminal, and wherein said circuit of said oil pressure switch comprises a normally open circuit and wherein said oil pressure switch further comprises a normally closed circuit coupled to said solenoid terminal, and further comprising cranking said engine and applying said control voltage through said solenoid terminal and said normally closed circuit of said oil pressure switch during said engine cranking.

38. The method of claim 34 wherein said control voltage is a first control voltage, and wherein said providing said electrical system further comprises providing a momentary switch coupled between the first and second terminals of the capacitor and moveable between at least an on position and a momentary position, and further comprising moving said momentary switch to said momentary position and applying a second control voltage with said capacitor to said relay when said momentary switch is moved to said momentary position, and wherein said positioning said relay in said closed-circuit condition in response to said control voltage being applied thereto comprises positioning said relay in said closed-circuit condition in response to said second control voltage being applied thereto.

39. The method of claim 38 wherein said providing said electrical system comprises providing third and fourth electrical paths connecting said momentary switch and said first and second terminals of said capacitor.

40. The method of claim 38 wherein said momentary switch is further coupled between said relay and said oil pressure switch, and wherein said applying first control voltage comprises positioning said momentary switch in said on position.

41. The method of claim 38 wherein said first and second control voltages are substantially the same.

42. The method of claim 38 wherein said providing said electrical system further comprises providing a solenoid switch coupled to the cranking motor and comprising a solenoid terminal coupled to said relay with an electrical path, wherein a diode is disposed in said electrical path between said solenoid terminal and said relay, and further comprising cranking said engine and applying said control voltage through said solenoid terminal and said electrical path to said relay during engine cranking.

43. The method of claim 42 wherein said solenoid further comprises a battery terminal and wherein said providing said electrical system further comprises providing a momentary switch coupled between the battery terminal and the relay, wherein said momentary switch is connected to said electrical path between said solenoid terminal and said relay at a location between said diode and said relay, and further comprising closing said momentary switch and charging said capacitor with at least one of said battery and an external charging device, whereby said diode prevents current from flowing to said solenoid terminal.

44. The method of claim 34 wherein said capacitor is characterized by a capacitance greater than about 150 farads and an internal resistance at 20° C. less than about 0.008 ohms.

45. The method of claim 44 wherein said capacitor is characterized by an internal resistance at 1 kHz and 20° C. less than 0.008 ohms.

46. The method of claim 34 wherein said relay is included in said second electrical path.

* * * * *